W. PESTEL.
BALANCE.
APPLICATION FILED MAR. 5, 1914.
1,128,500.
Patented Feb. 16, 1915.
2 SHEETS—SHEET 1.
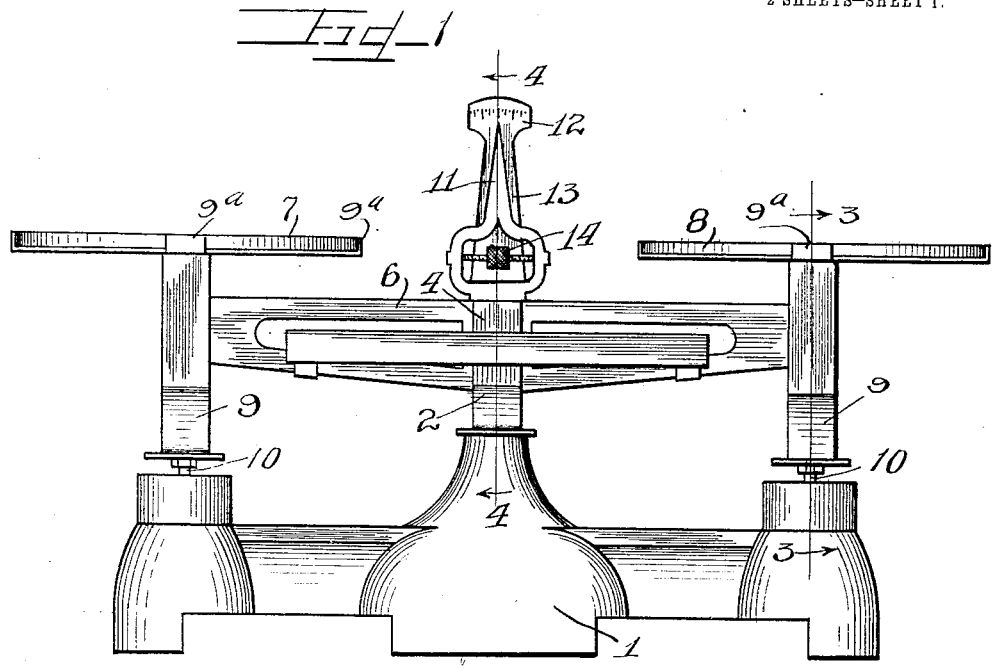
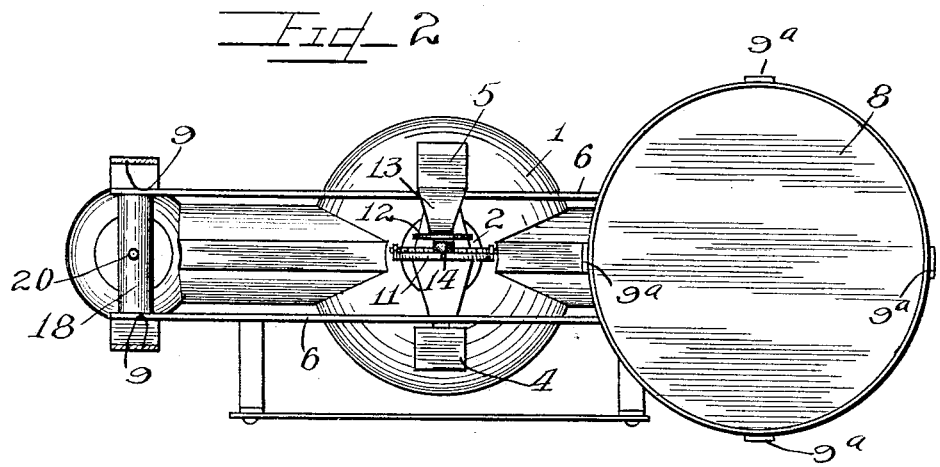

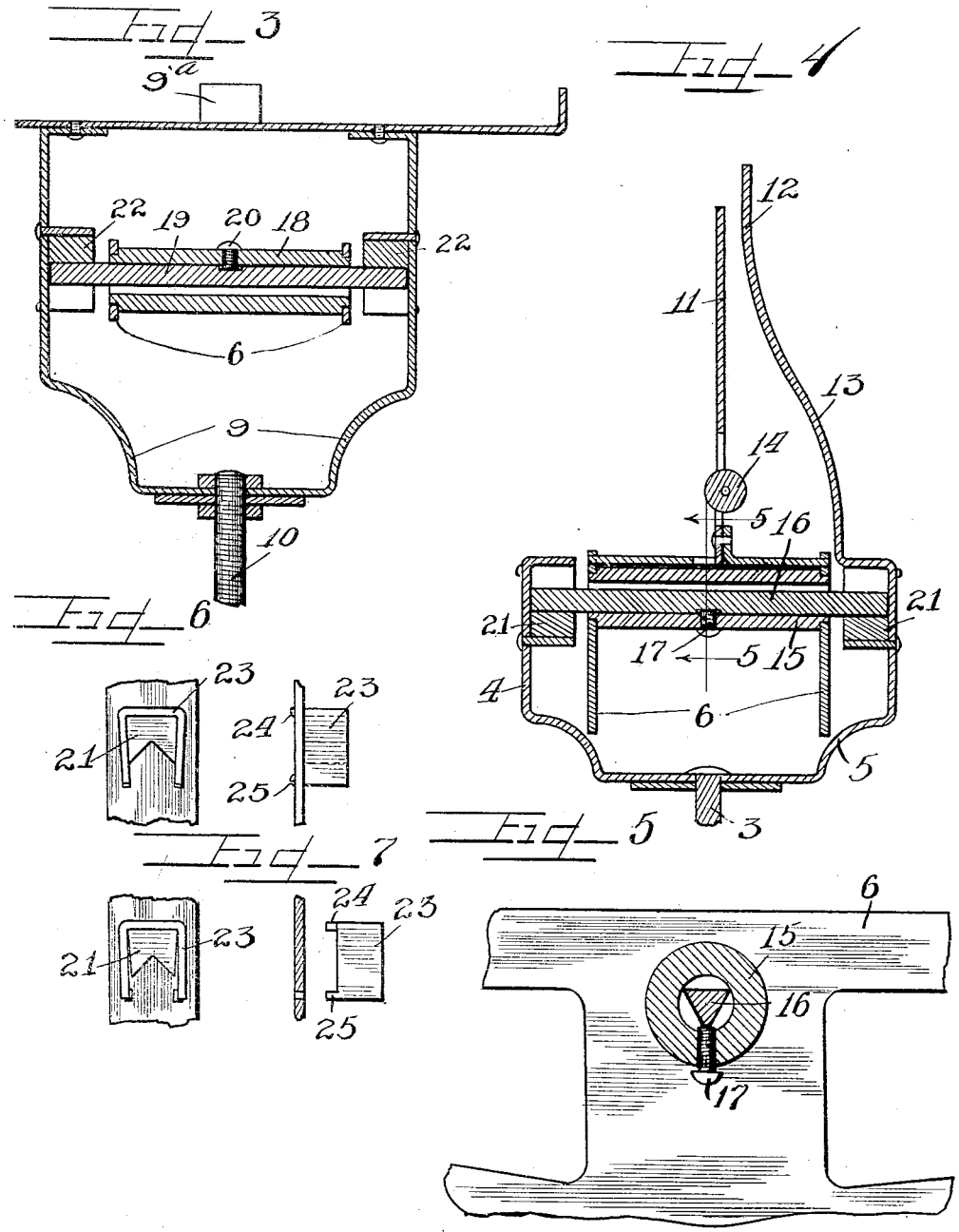

UNITED STATES PATENT OFFICE.

WILLIAM PESTEL, OF CHICAGO, ILLINOIS, ASSIGNOR TO WOLDENBERG & SCHAAR, OF CHICAGO, ILLINOIS, A CORPORATION OF ILLINOIS.

BALANCE.

1,128,500.      Specification of Letters Patent.      Patented Feb. 16, 1915.

Application filed March 5, 1914. Serial No. 822,551.

*To all whom it may concern:*

Be it known that I, WILLIAM PESTEL, a citizen of the United States, and a resident of the city of Chicago, in the county of Cook and State of Illinois, have invented certain new and useful Improvements in Balances; and I do hereby declare that the following is a full, clear, and exact description of the same, reference being had to the accompanying drawings, and to the numerals of reference marked thereon, which form a part of this specification.

As heretofore constructed apothecaries' scales and other delicate balances have been more or less complicated, thus greatly increasing the expense of manufacture.

This invention relates to a balance which is built up of stampings of metal easily assembled, and affording a substantial construction of great simplicity.

It is an object of this invention to construct a beam balance wherein a balance beam consisting of stamped sheets joined together at their ends and middle by thimbles is provided, together with pan carriages, also formed from stamped portions of sheet metal, thereby affording a light and substantial construction.

It is furthermore an object of this invention to construct a beam balance wherein the balance beam and carriages are formed from stamped metal, and with agate and knife edge members for supporting the beam and supporting the pan carriages thereon which are releasably attached to said respective members.

It is finally an object of this invention to construct a device simple in operation, light in weight, and of substantial construction easily assembled.

The invention (in a preferred form) is hereinafter more fully described and defined in the accompanying drawings and specification.

On the drawings: Figure 1 is a front elevation of a beam balance embodying the principles of my invention. Fig. 2 is a top plan view thereof with one of the pans removed. Fig. 3 is a section on line 3—3 of Fig. 1. Fig. 4 is a section on line 4—4 of Fig. 1. Fig. 5 is a section on line 5—5 of Fig. 4. Fig. 6 is a front and side elevation of an agate attaching means, attached in position. Fig. 7 is a front and side elevation of an agate attaching means, unattached.

As shown in the drawings: My invention is shown in connection with a beam balance comprising a base 1, and provided with a central upright or standard 2, which, at its top, has secured thereon by means of a bolt 3, a stamped metal central bearing member with the arms 4, and 5, respectively. A balance beam formed of stamped parallel sheets or bars of metal, each denoted as a whole by the reference numeral 6, is supported in said central bearing arms 4, and 5, and at its ends supports the weighing pans 7, and 8, respectively. Integrally connected stamped sheet metal arms 9, forming the pan carriage, have secured thereto pan rests $9^a$, for said weighing pans. At the junction of said arms 9, a bolt 10, is secured therethrough, which extends downwardly and loosely through an aperture in the ends of the base 1, said bolts acting as guides for the ends of the beam and, if desired, they may also carry a weight concealed within the base 1, to increase the stability of the pans supported on the ends of said balance beam.

An indicating needle 11, is secured to and mounted on a plate extending centrally across the balance beam 6, and in its movement said needle sweeps over a scale 12, which is formed upon the end of an upstanding curved arm 13, integral with the arm 5, of the central bearing. A traveling weight 14, is mounted in the needle 11, in order to properly balance the scale when the pans are empty.

Mounted transversely in the scale beam and centrally thereof is a sleeve or thimble 15, through which extends a knife edge 16, triangular in cross-section, and held rigidly within said sleeve by means of an adjusting screw 17. Similarly thimbles 18, are secured at each end of the balance beam 6, and each have extending therethrough, the knife edges 19, in the latter case, however, said knife edges are directed upwardly and held in position by an adjusting screw 20. Said thimbles serve to connect and properly space the stamped bars 6, in proper relation to one another.

The extremities of the knife edge 16, rest in agate members 21, secured in the respective arms 4, and 5, of the central bearing, thereby supporting the entire balance beam and pans. Similarly agate members 22, of the same construction as those already mentioned, are mounted on the respective arms 9, secured to each of the scale pans, whereby said pans may be supported upon the knife edge members 19, and, of course, in the latter case said agates 21, are inverted. Each of said agate members is provided with a groove, the walls of which are substantially at right angles with one another to receive and support a knife edge properly centered therein, and furthermore the outer side walls of said agates are convergent toward one another. In order to accurately mount the agates, as shown in Fig. 4, the arms 4, and 5, are apertured and a resilient clamping member 23, provided with tongues 24, and 25, is sprung around each one of said agate members and said tongues are then projected through the apertures in said arms 4, and 5. Of course the apertures in said arms are made with great care and precision in order to insure proper positioning of the agates by said clamping members.

The operation is as follows: It is obvious that the scale pans, which are rigidly attached to the arm 9, carry the agate members 22, in inverted position owing to the fact that the respective knife edges 19, at the ends of the balance beam are upwardly directed, so that the pans may balance thereon. The balance beam itself, however, which carries the downwardly directed knife edge 16, is supported upon the upwardly directed agate members 21. Owing to the ease with which the clamps 23, may be engaged around the respective agate members, and sprung through the apertures in the member to which they are attached, it is obvious that the agate members are not only easily and quickly inserted or removed, but are accurately positioned.

I am aware that various details of construction may be varied through a wide range without departing from the principles of this invention. I therefore do not purpose limiting the patent granted otherwise than necessitated by the prior art.

I claim as my invention:

1. In a device of the class described a base, a stamped sheet metal central bearing secured thereto, agate members releasably mounted in said bearing, a scale carrying arm integral with said central bearing and extending upwardly therefrom, a balance beam formed of stamped sheets of metal, thimbles mounted at the ends and middle thereof, and knife edges extending releasably through each of said thimbles, with the central knife edge supported on the agates in said central bearing.

2. In a device of the class described a base, a stamped central bearing member afforded thereby, agate members releasably mounted in said central bearing, a scale carrying arm integral therewith, a balance beam comprising stamped bars of metal, thimbles at the ends and middle thereof joining said bars together and maintaining the same properly spaced, knife edge members releasably mounted in each of said thimbles, said knife edge member in said central thimble adapted to bear on said agate members in said central bearing to support the balance beam, pan carriages formed of integral stamped sheets of metal, and agate members releasably mounted in said pan carriages to bear on said knife edge members in the end thimbles of said balance beam to support said pan carriages.

In testimony whereof I have hereunto subscribed my name in the presence of two subscribing witnesses.

WILLIAM PESTEL.

Witnesses:
CHARLES W. HILLS, Jr.,
FRANK K. HUDSON.

Copies of this patent may be obtained for five cents each, by addressing the "Commissioner of Patents, Washington, D. C."